United States Patent
Sonobe (10) Patent No.: US 10,397,849 B2
(45) Date of Patent: Aug. 27, 2019

(54) RELAYING DEVICE, COMMUNICATION RELAYING METHOD AND VOICE COMMUNICATION SYSTEM

(71) Applicant: ICOM INCORPORATED, Osaka-shi, Osaka (JP)

(72) Inventor: Hirotaka Sonobe, Osaka (JP)

(73) Assignee: ICOM INCORPORATED, Osaka-shi, Osaka (JP)

( * ) Notice: Subject to any disclaimer, the term of this patent is extended or adjusted under 35 U.S.C. 154(b) by 319 days.

(21) Appl. No.: 15/321,639

(22) PCT Filed: Jan. 22, 2015

(86) PCT No.: PCT/JP2015/051651
§ 371 (c)(1),
(2) Date: Dec. 22, 2016

(87) PCT Pub. No.: WO2016/002238
PCT Pub. Date: Jan. 7, 2016

(65) Prior Publication Data
US 2017/0188291 A1 Jun. 29, 2017

(30) Foreign Application Priority Data
Jul. 4, 2014 (JP) .................................. 2014-138466

(51) Int. Cl.
*H04W 40/22* (2009.01)
*H04W 4/10* (2009.01)
(Continued)

(52) U.S. Cl.
CPC ......... *H04W 40/22* (2013.01); *H04L 65/4015* (2013.01); *H04L 65/4053* (2013.01);
(Continued)

(58) Field of Classification Search
CPC ....... H04W 40/22; H04W 76/10; H04W 4/10; H04W 84/12; H04L 65/4015; H04L 65/4053; H04L 65/4061; H04M 3/56
See application file for complete search history.

(56) References Cited

U.S. PATENT DOCUMENTS 9,319,850 B2 * 4/2016 Lin .......................... H04W 4/08
2006/0276213 A1 12/2006 Gottschalk et al.
(Continued)

FOREIGN PATENT DOCUMENTS

JP 2007-311920 A 11/2007
JP 2008-211400 A 9/2008
(Continued)

OTHER PUBLICATIONS

International Search Report of PCT/JP2015/051651.
(Continued)

*Primary Examiner* — Melvin C Marcelo
(74) *Attorney, Agent, or Firm* — Muncy, Geissler, Olds & Lowe, P.C.

(57) ABSTRACT

[Problem] To provide a voice communication system which uses a communication network, and with which a terminal device is capable of listening to both a previous call and a new call, even when another call is received during communication.
[Solution] Provided is a relay device which is equipped with: a network communication unit which communicates with terminal devices over a communication network; and a control unit which controls voice communication between the terminal devices. The control unit of the relay device forms a plurality of communication sessions, and allows a plurality of the terminal devices to each of the communication sessions. The terminal devices belonging to one of the communication sessions participate in communication in the communication session. The terminal devices assigned to (Continued)

Mixing Table

| Session Number | Belonging Terminal | Participating Terminal | Excluded Terminal | Communication Form (Calling Type) |
|---|---|---|---|---|
| 1 | 1,2,3 | 1,2,3 | — | Group(G1) |
| 2 | 3,4,5,6,7 | 4,5,6 | 3,7 | Group(G2) |
| 3 | 7,8 | 7,8 | — | Individual(8→7) | two or more communication sessions participate in communication in any one of the communication sessions. Voice signals received from terminal devices are transferred to other terminal devices participating in the communication session in which the aforementioned terminal devices are participating, and to terminal devices only belonging to the communication session.

9 Claims, 6 Drawing Sheets

(51) Int. Cl.
    *H04W 76/10*     (2018.01)
    *H04L 29/06*     (2006.01)
    *H04W 84/12*     (2009.01)
    *H04M 3/56*     (2006.01)

(52) U.S. Cl.
    CPC ........... *H04L 65/4061* (2013.01); *H04W 4/10* (2013.01); *H04W 76/10* (2018.02); *H04M 3/56* (2013.01); *H04W 84/12* (2013.01)

(56) References Cited

U.S. PATENT DOCUMENTS

| | | | |
|---|---|---|---|
| 2010/0009708 A1 | 1/2010 | Horio et al. | |
| 2010/0220846 A1* | 9/2010 | Gisby | H04M 3/56 379/202.01 |
| 2010/0255826 A1* | 10/2010 | Brewer | H04W 4/10 455/414.1 |
| 2017/0019758 A1* | 1/2017 | Tawara | H04W 4/02 |
| 2017/0332211 A1* | 11/2017 | Uwamori | H04M 3/42 |

FOREIGN PATENT DOCUMENTS

| | | |
|---|---|---|
| JP | 2009-212777 A | 9/2009 |
| WO | 2008/126259 A1 | 10/2008 |

OTHER PUBLICATIONS

Icom Inc., New Release of IP Advanced Radio System, Transceiver System That Works Over IP network, URL: http://www.icom.co.jp/release/20131002/, Published on Oct. 2, 2013, Retrieved on Oct. 24, 2016 (Discussed on p. 1 of the specification).

\* cited by examiner

Terminal Table

| Terminal Number | Active Flag | Additional Mixing | Setting Data Storage Address |
|---|---|---|---|
| 1 | ○ | Enabling | 001 |
| 2 | ○ | Enabling | 002 |
| ⋮ | ⋮ | ⋮ | ⋮ |
| 100 | × | Disabling | 100 |

Group Table

| Group Number | Belonging Terminal |
|---|---|
| G1 | 1,2,3 |
| G2 | 3,4,5,6,7 |
| ⋮ | ⋮ |
| G20 | 96,97,98,99,100 |

Mixing Table

| Session Number | Belonging Terminal | Participating Terminal | Excluded Terminal | Communication Form (Calling Type) |
|---|---|---|---|---|
| 1 | 1,2,3 | 1,2,3 | — | Group(G1) |
| 2 | 3,4,5,6,7 | 4,5,6 | 3,7 | Group(G2) |
| 3 | 7,8 | 7,8 | — | Individual(8→7) |

| Destination IP Address | Transmission Source IP Address | Data Body | | | |
|---|---|---|---|---|---|
| | | | Communication Information | | |
| | | Voice Signal | Calling Number | Transmission Source Terminal Number | Calling Type |

RELAYING DEVICE, COMMUNICATION RELAYING METHOD AND VOICE COMMUNICATION SYSTEM

TECHNICAL FIELD

The present invention relates to a voice communication system using a network such as a wireless LAN and particularly to a relaying device, a communication relaying method, a program, and a voice communication system for the voice communication.

BACKGROUND ART

A system for performing conversation over a wireless LAN by using a handy transceiver type mobile terminal device and a server for relaying a communication has been put into practice (see Non-Patent Literature 1). In this voice communication system, since a voice signal is compressed and packetized for transmission/reception, a plurality of speeches can be transmitted at the same time.

The conversation between the terminal devices can be performed not only in a half-duplex mode similar to the conventional wireless transceiver but also in a full-duplex mode in which a plurality of terminal devices can speak at the same time as in telephone since packet communication is used as described above. The voices made at the same time are mixed by the server and delivered to the communicating terminal devices.

CITATION LIST

Non-Patent Literature

[Non-Patent Literature 1] Internet <URL: http://www.i-com.co.jp/release/20131002/> Icom Inc., "New Release of IP Advanced Radio System, Transceiver System That Works Over IP network", [online], Oct. 2, 2013 [searched on Jun. 20, 2014]

SUMMARY OF INVENTION

Moreover, in the voice communication system, it is also possible to perform a plurality of communications (sessions) at the same time, and a plurality of terminal devices can participate in the respective communications. However, even if the plurality of communications is performed in parallel at the same time, one terminal device could participate only in one communication. That is, if there is another call (a new call) during communication (or during calling), in a case where the new call has a higher priority, the communication will be switched to the new call, and the previous conversation cannot be heard any more. On the contrary, in a case where the new call has a lower priority, the new call will be discarded, and the voice of the conversation cannot be heard.

Thus, the present invention has an object to provide a relaying device, a communication relaying method, a program, and a voice communication system enabling, in a voice communication system over a communication network, even if another call is made during communication of the terminal device, the previous conversation and the new conversation can be both heard.

A relaying device of the present invention comprises: a network communication unit connected to a communication network and communicating with a terminal device over the communication network; and a control unit controlling voice communication between the terminal devices by transferring a voice signal received from the terminal device via the network communication unit to the terminal device of a communication partner. The control unit forms a plurality of communication sessions in which the plurality of terminal devices communicate with each other so as to allow the plurality of terminal devices to belong to each of the communication sessions; allows the terminal device belonging to one communication session to participate in communication of that communication session, and allows the terminal device belonging to two or more communication sessions to participate in the communication of any one of those communication sessions; and transfers the voice signal received from the terminal device as a voice signal of the communication session in which that terminal device participates to another terminal device participating in this communication session and at least some of the terminal devices belonging to the communication session but not participating therein.

By means of the configuration of the present invention as above, the terminal device is capable of talking by transmitting the voice signal to the participating communication session, while the voice signal cannot be sent to the communication session to which it belongs but in which it does not participate, but is capable of receiving a talking voice signal of such a communication session.

It may be so configured that a storage unit is provided for each of the terminal devices for storing whether the voice signal of the communication session to which the terminal device belongs but in which it does not participate is to be transferred or not, and the control unit determines to which terminal device of the terminal devices belonging to the communication session but not participating therein the voice signal of this communication session is to be transferred on the basis of a storage content of the storage unit.

The control unit forms a communication session in response to a call from the terminal device and may cancel this communication session if a state in which a voice signal is not received from the terminal device participating in the communication session continues for a certain period of time.

The control unit may select the terminal device allowed to belong to the communication session to be formed on the basis of information specifying a communication partner included in the call from the terminal device.

The control unit may determine in which communication session the terminal device belonging to two or more communication sessions is allowed to participate on the basis of a priority order of the two or more communication sessions.

The control unit transfers the voice signal to the terminal device for each frame, which is a short time section of approximately 20 milliseconds, and when it transfers the voice signals received from the plurality of terminal devices in one frame to another terminal device, the control unit may mix the plurality of voice signals and transmit them as a single voice signal.

The control unit may perform the communication with the terminal device in the full-duplex mode.

A communication relaying method of the present invention is executed by a relaying device comprising a network communication unit and a control unit. The network communication unit is connected to a communication network and communicates with a terminal device over this communication network. The control unit controls voice communication between the terminal devices by transferring a voice signal received from the terminal device via the network communication unit to the terminal device of a communication partner. The control unit executes: a first step for forming a plurality of communication sessions to which a plurality of the terminal devices belong; a second step for allowing the terminal device belonging to one communication session to participate in the communication in that communication session; a third step for allowing the terminal device belonging to two or more communication sessions to participate in the communication in any one of those communication sessions; and a fourth step for transferring the voice signal received from the terminal device as a voice signal of the communication session in which that terminal device participates to another terminal device participating in the communication session and at least some of the terminal devices belonging to the communication session but not participating therein.

A program of the present invention allows a control unit of a relaying device connected to a communication network and comprising a network communication unit communicating with a terminal device over the communication network to function as the following means: first means for forming a plurality of communication sessions to which a plurality of the terminal devices belong; second means for allowing the terminal device belonging to one communication session to participate in the communication in that communication session; third means for allowing the terminal device belonging to two or more communication sessions to participate in the communication in any one of those communication sessions; and fourth means for transferring the voice signal received from the terminal device as a voice signal of the communication session in which that terminal device participates to another terminal device participating in the communication session and at least some of the terminal devices belonging to the communication session but not participating therein.

A voice communication system of the present invention has a relaying device and a plurality of terminal devices connected to each other over a communication network. The terminal device transmits a voice signal including information specifying a communication partner to the relaying device. The relaying device forms a communication session to which the terminal devices belong including the terminal device having transmitted the voice signal and the terminal device of its communication partner. If a plurality of communication sessions is formed, when there is the terminal device belonging to two or more communication sessions, the relaying device allows that terminal device to participate in any one of those communication sessions. The relaying device transfers the voice signal received from each of the terminal devices as a voice signal of the communication session in which that terminal device participates to another terminal device participating in the communication session and at least some of the terminal devices belonging to the communication session but not participating therein. The terminal device receives the voice signal from the relaying device and outputs it as a sound.

Advantageous Effect of Invention

According to the present invention, in the voice communication system over the communication network, the terminal device can belong to a plurality of the communication sessions and can participate in one of them, can hear and speak in the communication session in which it participates, and can hear the conversation between the other terminal devices in the communication session though it cannot speak in the communication session to which it only belongs.

DETAILED DESCRIPTION OF THE EMBODIMENT

Figure 1:
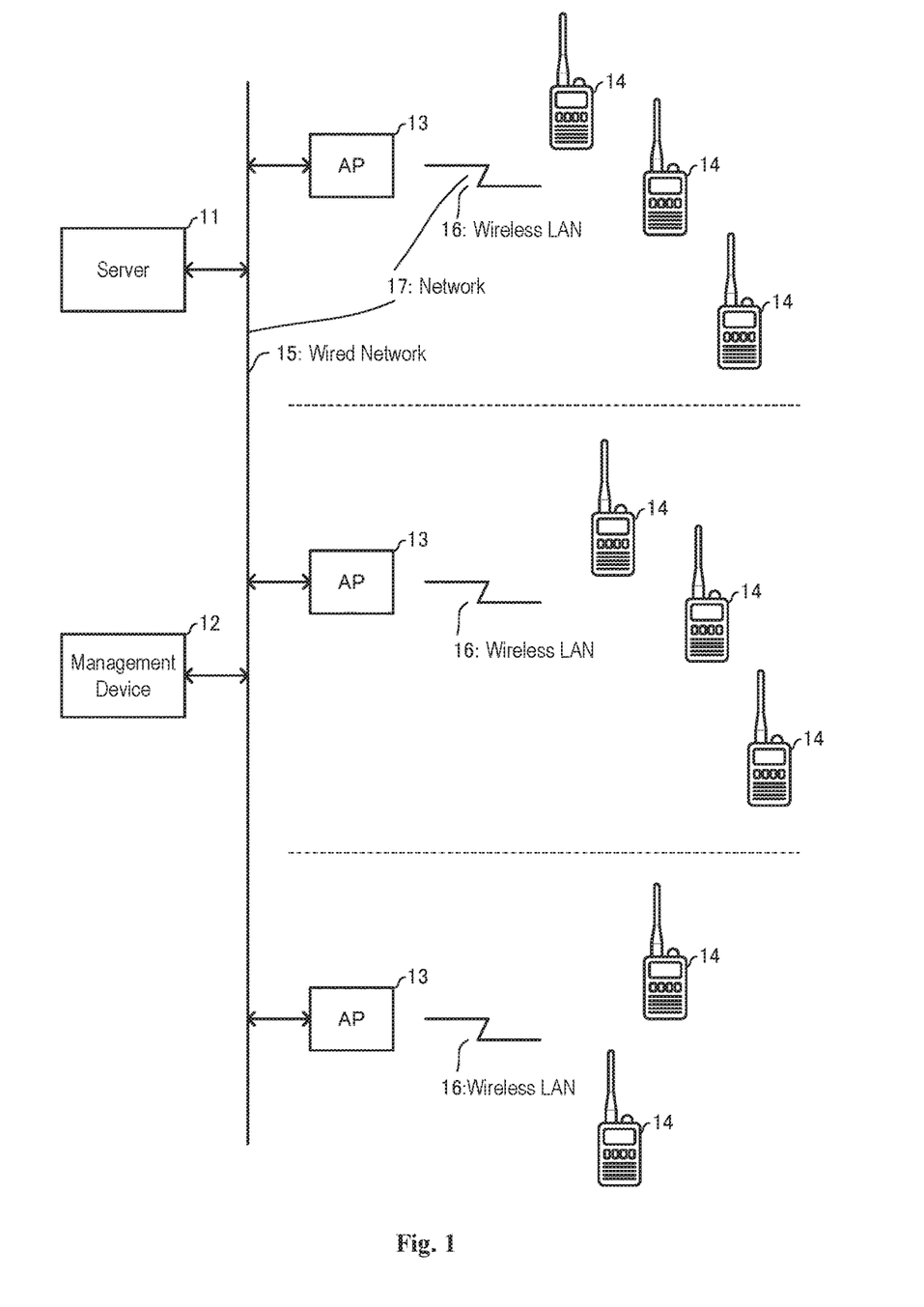
FIG. 1 is a configuration diagram of a voice communication system which is an embodiment of the present invention.
Figure 2:
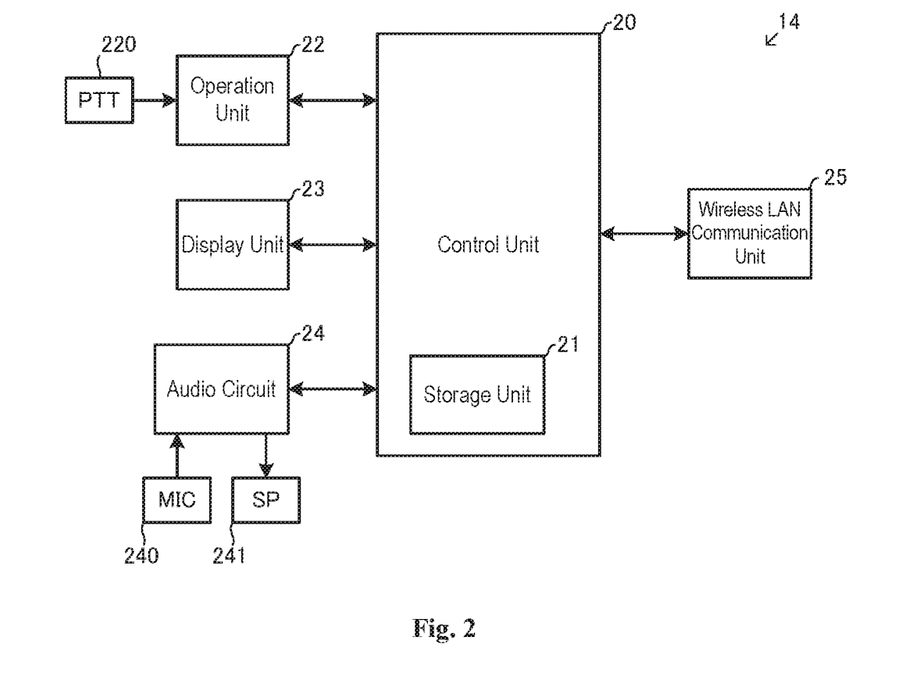
FIG. 2 is a block diagram of a terminal device used in the voice communication system.
Figure 3:
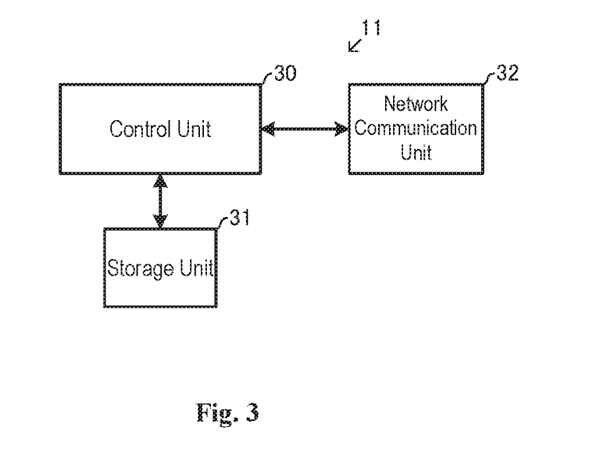
FIG. 3 is a block diagram of a server of the voice communication system.

A voice communication system of the present invention will be described with reference to the attached drawings. FIG. 1 is a configuration diagram of the voice communication system which is an embodiment of the present invention. FIG. 2 is a block diagram of a transceiver used in the voice communication system. FIG. 3 is a block diagram of a server used in the voice communication system. In this voice communication system, a plurality of terminal devices 14 performs communication with each other by using a wireless LAN (Local Area Network) 16 such as Wi-Fi. The terminal device 14 has a shape similar to a handy transceiver for wireless communication, and as illustrated in FIG. 2, it comprises PTT (push-to-talk) switch 220. The terminal device 14 functions as a wireless network device for transmitting/receiving a voice packet through a wireless access point (AP) 13. A server 11 which is a relaying device relays the communication between the terminal devices 14 over a wired network 15 and the wireless LAN 16 of the plurality of terminal devices 14. Hereinafter, the wired network 15 and the wireless LAN 16 shall be collectively referred to as a network 17.

The terminal device 14 is connected to the network 17 when it is activated. The terminal device 14 transmits a voice input from a microphone 240 to the server 11 when the PTT switch 220 is pressed by a user. The voice is packetized and transmitted to the server 11 over the network 17. In the voice packet, a terminal number and a group number of another terminal device 14 which is the communication partner are written as communication information (see FIG. 5). The server 11 transfers the voice received from the terminal device 14 to the terminal device 14 of the communication partner on the basis of destination information written in the packet.

The server 11 transfers the voice between the terminal devices 14 and also sets up the terminal device 14. When the terminal device 14 is connected to the network 17, the server 11 transmits setting data to the terminal device 14 and sets up the terminal device 14 into a state capable of communication. The setting data transmitted by the server 11 is a terminal number with which the terminal device 14 can communicate, an update program and the like.

As the wired network 15, an Ethernet (registered trademark) LAN, the internet and the like can be used. If the internet is included in the wired network 15, safe communication can be realized by using VPN (virtual private network). Moreover, as the wireless LAN 16, a communication mode conforming to IEEE802.11, such as Wi-Fi, can be applied. The terminal device 14 and the wireless access point 13 communicate with each other by the communication mode of this wireless LAN.

The wireless access points 13 are installed in plural. Each of the wireless access points 13 is installed on each floor or each room of a building, respectively, for example. As a result, depending on which wireless access point 13 the terminal device 14 is under the control of, which floor or which room the terminal device 14 is located in can be estimated.

Moreover, to the wired network 15, the management device 12 is connected. The management device 12 is configured with a personal computer in which a management program is installed, for example. The management device 12 makes an access to the server 11 in accordance with an operation of an administrator and sets tables and the like illustrated in FIGS. 4A and 4B in the server 11. Moreover, the management device 12 functions also as a single terminal device and is capable of communication with other terminal devices 14.

The terminal device 14 (user) communicates with another terminal device 14 in any one of forms, that is, individual communication (also called "individual calling"), group communication (also called "group calling"), and plenary communication (also called "plenary calling"). The individual communication is a one-to-one communication form in which the terminal device 14 performs communication by specifying and calling another single terminal device 14. The group communication is a form in which the terminal device 14 calls a group set in advance, and a plurality of the terminal devices 14 belonging to the group performs mutual communication. The plenary communication is a form in which all the terminal devices 14 capable of communication connected to the network 17 performs mutual communication upon a call by the one terminal device 14. The user operates his/her own terminal device 14, selects a desired communication form (also called "calling type") and a calling number (number of the called terminal device 14 or group) and presses the PTT switch 220. As a result, the terminal device 14 transmits a calling voice packet to the server 11.

The server 11 forms a communication session in accordance with the transmission of the calling voice packet from the terminal device 14. The communication session is a temporary set of a plurality of the terminal devices 14 transmitting/receiving the voice signal to/from each other by using the server as a relaying device. The communication session is also called a mixing group. In the case of the individual communication, the calling terminal device 14 and the called terminal device 14 participate in the communication session. In the case of the group communication, the terminal devices 14 belonging to the called group participate in the communication session. In the case of the plenary communication, all the terminal devices 14 capable of communication at that time participate in the communication session. The server 11 transfers the voice signal received from the terminal device 14 participating in the communication session to another terminal device 14 participating in the communication session after forming the communication session. If a state in which the communication is not performed, that is, a state in which a voice packet is not transmitted from any of the terminal devices 14 participating in the communication session continues for a predetermined holding time, the server 11 cancels the communication session.

The server 11 can allow a plurality of communication sessions to exist in parallel at the same time. However, each of the terminal devices 14 is allowed to participate in only any one of those communication sessions. There is a case in which one unit of the terminal device 14 can participate in a plurality of communication sessions. It is a case in which two communication sessions of the group communication are formed, and one unit of the terminal device 14 belongs to the both groups, for example. In this case, the server 11 causes this terminal device 14 to participate in the communication session with the highest priority.

Here, the terminal device 14 specified by the calling voice packet belongs to the communication session. The terminal devices 14 belonging to the communication session are two units, that is, the calling terminal device 14 and the called terminal device 14 in the case of the individual communication, and in the case of the group communication, they are all the terminal devices 14 belonging to the group. The devices which actually perform (participate in) the voice communication by transmitting/receiving the voice signal in the communication session are some or all of the belonging terminal devices 14, and they are called participating terminal devices.

If there is a unit of the terminal device 14 belonging to the plurality of communication sessions, the server 11 transmits the voice signal to the terminal device 14 by mixing the voice signal of the communication session to which it belongs but in which it does not participate with the voice signal of the communication session in which it participates (additional mixing). As a result, the terminal device 14 can hear both the voice of the participating communication session and the voice of the belonging but not-participating communication session. As a result, the terminal device cannot participate in the conversation of the communication session to which it belongs but in which it does not participate but can monitor the conversation contents.

Enabling/disabling of the function of additional mixing is set for each of the terminal devices 14, and even if the disabled terminal device 14 belongs to a plurality of the communication sessions, the voice signal to be transferred to that terminal device 14 is not subjected to the additional mixing. The enabling/disabling of the additional mixing function is stored in a terminal table 301 illustrated in FIG. 4A. Setting of the enabling/disabling of the additional mixing function to the terminal table 301 may be made by the management device 12 for all the terminal devices 14 or it may be so configured that each of the terminal devices 14 can set enabling/disabling of its own additional mixing function. It may also be configured that this setting can be made both from the management device 12 and the terminal device 14.

FIG. 2 is a block diagram of the terminal device 14. As described above, the terminal device 14 has an appearance of a handy transceiver, but in terms of functions, it is a wireless network device for transmitting/receiving a voice packet through the wireless access point (AP) 13 of the wireless LAN. The control unit 20 controls an operation of the terminal device 14 and is configured with a microprocessor. The control unit 20 has a storage unit 21 in which various types of data is stored. In this storage unit 21, setting data downloaded from the server 11 is stored. To the control unit 20, an operation unit 22, a display unit 23, an audio circuit 24, and a wireless LAN communication unit 25 are connected. The operation unit 22 includes key switches such as the PTT switch 220 and receives the operation by the user and inputs its operation signal to the control unit 20. The display unit 23 includes a liquid crystal display. The liquid crystal display displays an identification number of the communication partner selected by the operation of the user, an identification number of the communication partner who called and the like.

The audio circuit 24 has a microphone 240 and a speaker 241. The control unit 20 decodes the received voice packet and inputs it in the audio circuit 24. The audio circuit converts this decoded audio signal to an analog signal and outputs it from the speaker 241. The audio circuit 24 converts the voice signal input from the microphone 240 to a digital signal and inputs it to the control unit 20. The control unit 20 makes this digital audio signal into a voice packet and inputs it to the wireless LAN communication unit 25. The wireless LAN communication unit 25 has a circuit for performing wireless communication in a communication mode conforming to the aforementioned IEEE802.11. The wireless LAN communication unit 25 transmits the packet input from the control unit 20 to the wireless access point 13 and also inputs the packet received from the wireless access point 13 to the control unit 20.

When the user utters voice toward the microphone 240 while pressing on the PTT switch 220, the terminal device 14 edits this voice signal into a voice packet and transmits it to the server 11.

The terminal device 14 has a VOX circuit together with the PTT switch 220. The VOX circuit determines whether the talking voice (voice signal) has been input or not on the basis of an input level of the microphone 240 and its duration, and if it determines that the talking voice has been input, it switches the device to a transmission state (PTT switch on). The terminal device 14 may switch on/off of transmission by using the VOX circuit instead of the PTT switch 220 or together with the PTT switch 220. A transceiver for general wireless communication is in a simplex mode incapable of reception of a wireless signal in the transmission state. On the other hand, since the terminal device 14 transmits/receives the voice signal in the voice packet communication through the wireless LAN 16, it can perform transmission of the voice packet and the reception of the voice packet in parallel. The terminal device 14 is capable of the full-duplex mode communication in which the transmission and reception of the voice signal are performed in parallel at the same time by using this function. However, the terminal device 14 edits/transmits the voice packet only when the talking voice is input by the PTT switch 220 or the VOX function so that a voiceless voice packet is not continuously transmitted even if the full-duplex communication is performed.

The server 11 transfers the voice signal included in the voice packet received from the terminal device 14 over the network 17 to the terminal device 14 of the communication partner over the network 17. In the case of the group communication, the voice signal is transferred to the plurality of terminal devices 14 belonging to the group. Moreover, in the case of the group communication, the users of the plurality of terminal devices 14 participating in that communication session speak at the same time, and the voice signals are transmitted from the plurality of terminal devices 14 at the same time in some cases. In such a case, the server 11 edits a new voice signal by mixing the voice signals of the plurality of voice packets and makes this new voice signal into a voice packet and transfers it to each of the terminal devices 14 belonging to the communication session. The server 11 transfers the voice packet of mixing of all the voice signals to the terminal device 14 not having transmitted the voice signal at that time and transfers the voice packet of mixing of the voice signals other than the voice signal transmitted by that terminal device 14 to the terminal device 14 transmitting the voice signal at that time. As a result, an echo of the voice signal transmitted by itself does not occur in the terminal device 14 having transmitted the voice signal. In the case of the communication by plenary calling, too, the mixing similar to that of group calling is performed.

FIG. 3 is a block diagram of the server 11. The server 11 has a control unit 30, a storage unit 31, and a network communication unit 32. The storage unit 31 is configured with a hard disk, a RAM and the like and stores various tables illustrated in FIG. 4 and the setting data of each of the terminal devices 14, for example. The control unit 30 performs set-up of the terminal device 14, mixing of the voice signal and the like. The network communication unit 32 controls communication with the wired network 15.

Figure 4A:
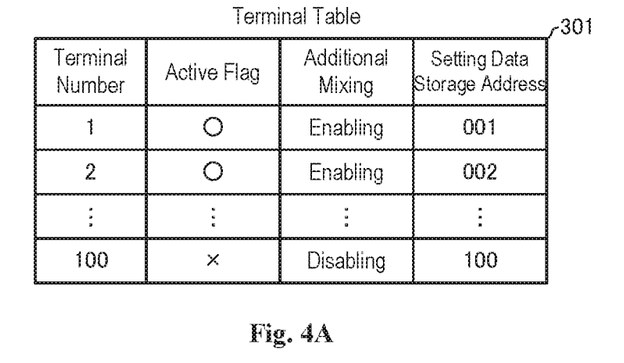
FIG. 4A is a diagram illustrating a terminal table set in a server.
Figure 4B:
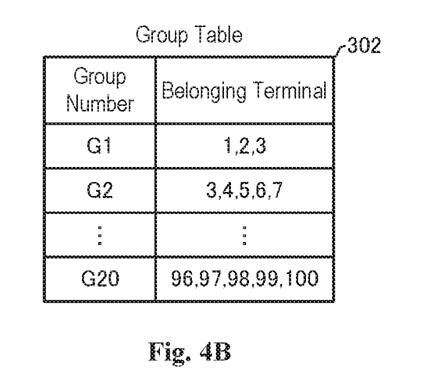
FIG. 4B is a diagram illustrating a group table set in the server.
Figure 4C:
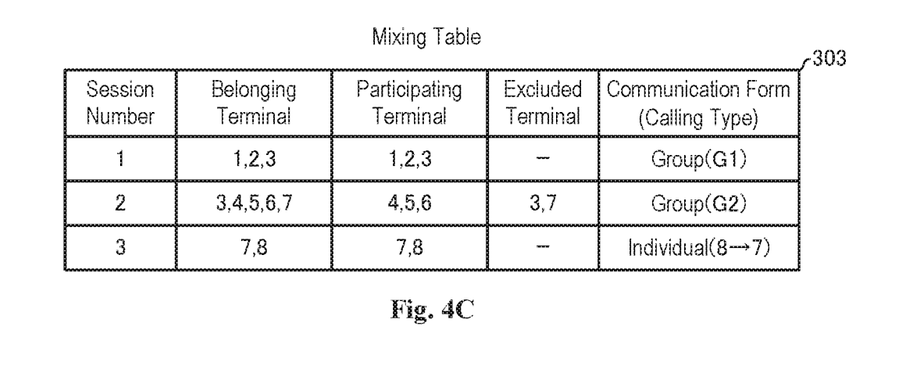
FIG. 4C is a diagram illustrating a mixing table set in the server.

FIGS. 4A, 4B, and 4C are diagrams illustrating the tables provided in the storage unit 31 of the server 11.

FIG. 4A is a diagram illustrating the terminal table 301. The terminal table 301 is a table for the server 11 to manage the terminal device 14. Each of the terminal devices 14 is identified by a terminal number which is an identification number uniquely assigned to each. In the terminal table 301, an active flag, an enabling/disabling flag of additional mixing function, and a storage address of the setting data are stored. The active flag is a flag indicating that the terminal device 14 is connected to the network 17, receives download of various types of data from the server 11 and becomes capable of communication. The active flag is set when the server 11 has completed registration of the terminal device 14. The enabling/disabling flag of the additional mixing function is a flag for storing whether the aforementioned additional mixing function has been enabled or not. The enabling/disabling flag is set/reset by the management device 12. The setting data includes update data of a program (firmware), a group to which it belongs, a directory recording other groups for which communication is allowed and the like, for example.

The server 11 communicates with the terminal device and confirms presence of the terminal device 14 at appropriate timing. The appropriate timing is timing when the connected wireless access point 13 is switched, every certain period of time or the like.

FIG. 4B is a diagram illustrating a group table 302. The group table 302 is a table for the server 11 to manage the group. Each of the groups is identified by a group number which is an identification number uniquely assigned to each. In the group table 302, a group number and the terminal number of the terminal device 14 belonging to the group are stored for each group. The number of the terminal devices 14 belonging to each of the groups only needs to be one or more. The terminal table 301 and the group table 302 are set by an operation of the management device 12 by the administrator. Moreover, as described above, the enabling/ disabling flag of the additional mixing function may be also set from each of the terminal devices 14.

FIG. 4C is a diagram illustrating a mixing table 303. The mixing table 303 is a table for managing a communication session currently being formed. The communication session is a temporary group of the terminal devices 14 formed for mutual communication (transmission/reception of the voice signal) using the server 11 as a relaying device. In the case of the individual communication, the terminal devices 14 belonging to the communication session are two units of the terminal devices 14, that is, the calling terminal device 14 and the called terminal device 14. In the case of the group communication, the terminal device 14 belonging to the communication session is the terminal device 14 belonging to any of the groups set in the group table 302 in FIG. 4B. The mixing table 303 has a plurality of lines (records) and stores information of one communication session on each line.

The mixing table 303 stores a session number, a belonging terminal number, a participating terminal number, an excluded terminal number, and communication form information for each of the communication sessions. One field of the belonging terminal number, the participating terminal number, and the excluded terminal number can be omitted. The session number is a number for identifying this communication session.

In a column (field) of the belonging terminal number, the terminal number of the terminal device 14 belonging to this communication session is stored. The terminal devices 14 belonging to the communication session are, in the case of the individual communication, two units, that is, the calling terminal device 14 and the called terminal device 14, and in the case of the group communication, they are all the terminal devices 14 belonging to the group. In a field of the participating terminal number, the terminal number of the terminal device 14 actually participating in the mutual communication in the belonging terminal devices is stored. The terminal device 14 can participate only in one communication session. The terminal device 14 belonging to (capable of participating in) the plurality of communication sessions participates in the communication session with high priority in them and only belongs to and does not participate in the communication session with low priority. To belong to the plurality of communication sessions is a case in which there is a plurality of group callings and one unit of the terminal device 14 belongs to the both groups or a case in which an individual calling is made around the group call, for example. In a field of the excluded terminal number, the number of the terminal device 14 only belonging but not participating since it is participating in another communication session with higher priority is stored. In a field of the communication form information, whether this communication session is formed by the individual calling, by the group calling or by the plenary calling is stored.

The priority in the plurality of communication sessions existing at the same time is determined by the following rule. "The priority is different depending on the communication form, and the priority is higher in an order of the plenary communication, the individual communication, and the group communication." and "if a plurality of the communication sessions formed in the same communication form exists, the communication session formed earlier has higher priority."

If the terminal device 14 belongs to the plurality of communication sessions at the same time, the server 11 causes the terminal device 14 to participate in the communication session determined to have the highest priority by the aforementioned rule. When the terminal device 14 is participating in a first communication session, if a second communication session is formed in parallel, in a case where the priority of the first communication session is higher, the server 11 causes the terminal device 14 to continuously participate in the communication session in which it is currently participating. On the other hand, if the second communication session formed later has higher priority, the server 11 cancels the terminal device 14's participation in the communication session with lower priority in which the terminal device 14 is currently participating and causes the terminal device 14 to participate in the new communication session with higher priority. Moreover, when the communication session with higher priority in which the terminal device 14 is participating is cancelled, if the communication session with lower priority continues, the server 11 causes the terminal device 14 to participate in the communication session with lower priority from the middle thereof.

The server 11 determines in which communication session the terminal device 14 is made to participate on the basis of the aforementioned rule and writes the determination contents in the mixing table 303. The terminal number of the terminal device 14 belonging to and participating in the communication session is written in the field of the belonging terminal and in the field of the participating terminal on the line of the communication session of the mixing table 303. The terminal number of the terminal device 14 belonging to the communication session but not participating in it is written in the field of the belonging terminal and in the field of the excluded terminal on the line of the communication session in the mixing table 303.

Figure 5:
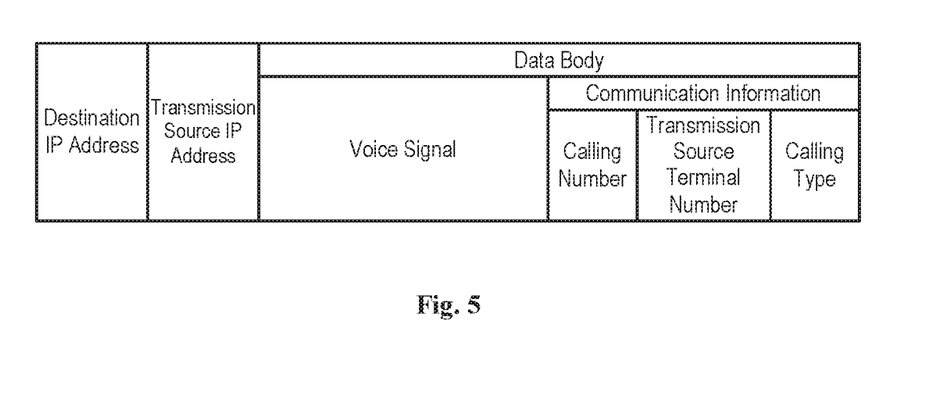
FIG. 5 is a diagram illustrating an example of configuration of a voice packet.

FIG. 5 is a diagram illustrating configuration of a voice packet transmitted from the terminal device 14 to the server 11. The terminal device 14 creates a packet for each frame (20 milliseconds, for example) and transmits it to the server 11 while the PTT switch 220 is pressed. The voice packet is a packet having a digitalized voice signal for one frame and communication information as a data body (payload). The communication information includes a transmission source terminal number, a calling number, and calling type (communication form) information. The calling number is a terminal number or a group number of a transmission destination of the voice signal. The server 11 determines which communication session the terminal device 14 sending the voice packet belongs, or whether the voice packet is that of a new calling or not (whether a new communication session is to be formed or not) by checking the communication information when receiving the voice packet.

The terminal device 14 and the server 11 perform transmission of the voice signal by the unit of a frame. Since the terminal device 14 transmits the voice packet using a trigger of pressing on the PTT switch 220 by the user, frames between each of the terminal devices 14 and the server 11 are not synchronized. In each frame, the server 11 mixes the voice signal from each of the terminal devices 14 received within time of the frame for each communication session or to each of the terminal devices 14. Then, the server transmits the mixed voice signal (MIX voice signal) to each of the terminal devices 14. To the terminal device 14 belonging to the plurality of communication sessions, the server 11 further creates and transmits one voice signal mixed a plurality of MIX voice signals, which are the MIX voice signal of the communication session in which the terminal device 14 participates and the MIX voice signal of the communication session to which the terminal device 14 only belongs. In the voice packet transmitted from the server 11 to the terminal device 14, the communication information of the communication session in which the terminal device 14 participates is written.

Figure 6:
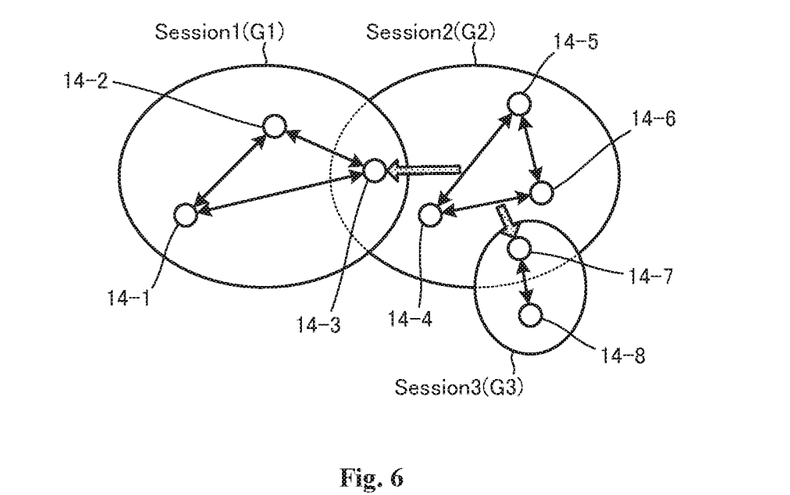
FIG. 6 is a diagram illustrating a form of transmission/reception of a voice signal when a plurality of communication sessions is formed.

With reference to the mixing table 303 in FIG. 4C and the diagram for explaining a form of transmission/reception of the voice signal in the communication session in FIG. 6, the belonging terminal, the participating terminal, and the excluded terminal when a plurality of the communication sessions is formed at the same time and a form of the transmission/reception of the voice signal will be described. FIG. 6 illustrates the belonging terminal and the participating terminal when the communication session is formed in accordance with contents of the mixing table 303 in FIG. 4C. In FIG. 6, suffixes are given to number each of the terminal devices 14 such as "14-$n$ ($n$=1, 2, 3, . . . )", but in the explanation of this figure, the suffixes are omitted and each of the terminal devices 14 is described as the terminal device $n$ for facilitation of the explanation.

First, in the mixing table 303 of FIG. 4C, three communication sessions 1, 2, and 3 are formed. The communication session 1 is a communication session formed by a group calling of the group number 1. The belonging terminals of the communication session 1 are 1, 2, and 3. All the terminal devices 1, 2, and 3 of them participate in the session, and there is no excluded terminal. The communication session 2 is a communication session formed by a group calling of the group number 2. The belonging terminals of the communication session 2 are 3, 4, 5, 6, and 7 totaling in five terminals, and the terminal device 3 among them participates in the communication session 1 with high priority formed earlier, and the terminal device 7 participates in the communication session 3 of the individual calling with higher priority which will be described later. Therefore, the terminals participating in the communication session 2 are 4, 5, and 6 totaling in three terminals, and the terminal devices 3 and 7 are excluded terminals. However, the voice signals transmitted/received among the terminal devices 4, 5, and 6 participating in the communication session 2 are also transmitted to the terminal devices 3 and 7, and the users of the terminal devices 3 and 7 can hear transaction of conversation in the communication session 2.

The communication session 3 is formed by calling of the terminal device 7 by the terminal device 8 in the individual calling. Since the communication session of the individual calling has higher priority than the communication session of the group calling, though the communication session 3 is formed after the communication session 2, the terminal device 7 having participated in the communication session 2 until then exits the communication session 2 and participates in the communication session 3 and is made into the excluded terminal in the communication session 2. By means of the processing above, the talking voice is transmitted also to the terminal device 14 belonging to but not participating in the communication session and it is not completely excluded from the conversation in the communication session.

Figure 7A:
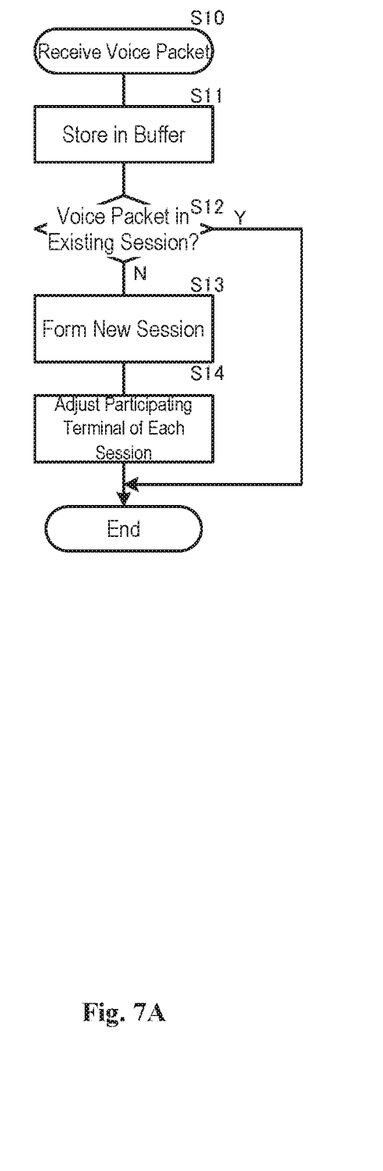
FIG. 7A is a flow chart illustrating voice packet reception processing of the server.

With reference to flow charts in FIGS. 7A and 7B, an operation of the server 11 will be described. FIG. 7A is a flow chart illustrating the operation when the server 11 receives a voice packet from the terminal device 14. When the server 11 receives the voice packet (S10), this processing is executed. The control unit 30 stores contents of the received voice packet in a buffer provided in the storage unit 31 (S11). The control unit 30 determines whether this voice packet (voice signal) is the one in the communication session having been already formed (S12). If the voice packet received this time is the one in the communication session having been already formed (YES at S12), the control unit 30 finishes the processing as it is. If the received voice packet is not the one in an existing communication session (NO at S12), the control unit 30 determines that the voice packet received this time is a calling voice packet and forms a new communication session on the basis of the communication information of the voice packet and registers it in the mixing table 303 (S13). The terminals belonging to this communication session include all the terminal devices 14 to be called. If the belonging terminals include the terminal device 14 belonging to another existing communication session, the control unit 30 adjusts in which of the communication sessions the terminal device 14 belonging to the both is made to participate (S14) on the basis of the priority order of this communication session and the existing communication session. That is, if the existing communication session has higher priority, the terminal device 14 is left to participate in the existing communication session and is made into an excluded terminal in this new communication session. On the contrary, if the new communication session has higher priority, the terminal device 14 is made to participate in this new communication session and registration thereof in the existing communication session in which it has participated until then is changed to an excluded terminal.

Figure 7B:
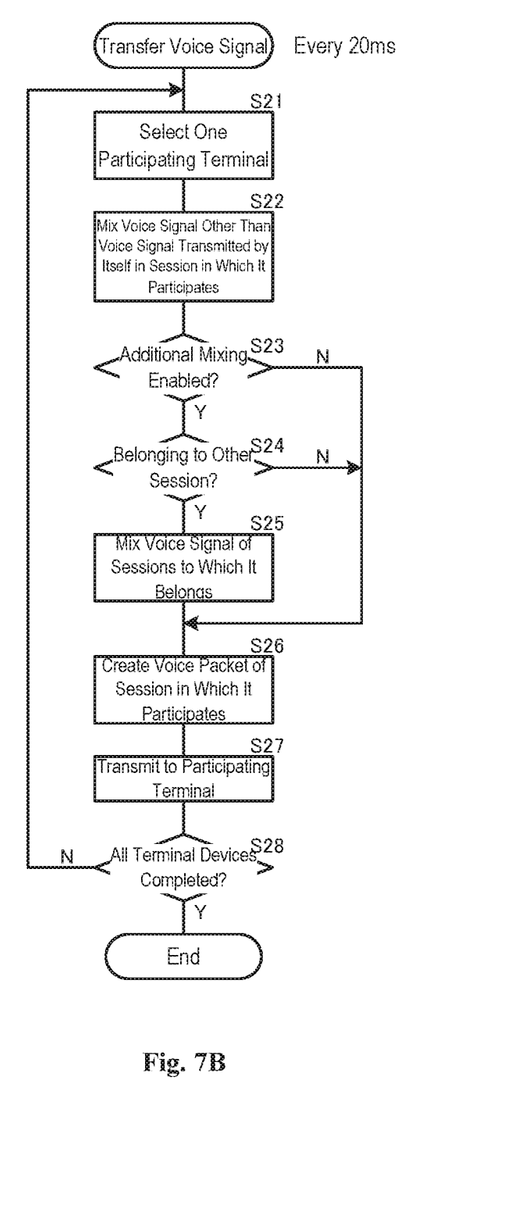
FIG. 7B is a flow chart illustrating voice signal transfer processing of the server.

FIG. 7B is a flowchart illustrating a voice signal transfer operation of the server 11. This processing is executed in each frame (20 milliseconds, for example). First, the control unit 30 selects any one of the communication sessions and selects one terminal device 14 participating in the communication session (S21). The control unit 30 mixes the voice signal received from the participating terminal device 14 of the communication session (S22). However, in order to prevent an echo of the signal, the voice signal received from the terminal device 14 selected at S21 is excluded from the mixing target. Then, the control unit 30 determines whether the additional mixing function is enabled for this terminal device 14 or not (S23). This determination is made with reference to the terminal table 301. If the additional mixing function is enabled (YES at S23), the control unit 30 searches the communication session other than that to which this (selected) terminal device 14 belongs (S24).

If the additional mixing function is disabled (NO at S23), or if there is no other communication session to which this terminal device 14 belongs (NO at S24), the control unit 30 generates a voice packet having a voice signal mixed at S22 and the communication information of the participating communication session as contents (S26) and transmits the voice packet to this terminal device 14 (S27). On the other hand, if there is a communication session to which this terminal device 14 belongs (YES at S24), the control unit 30 further mixes, in addition to the voice signal mixed at S22, a voice signal received in a frame this time from the terminal device 14 participating in the communication session to which it belongs with the voice signal mixed at S22 (S25) and proceeds to S26. After the control unit 30 executes the aforementioned processing for all the terminal devices 14 participating in all the communication sessions, it finishes the processing (S28).

By means of this processing, each of the terminal devices 14 receives a talking voice signal other than voice transmitted by itself in the communication session in which it participates. As a result, an echo can be prevented. Moreover, if there is another communication session in which the terminal device does not participate but to which it belongs, it also receives the mixed talking voice signal of the communication session and can monitor the communication relating to itself.

Figure 7C:
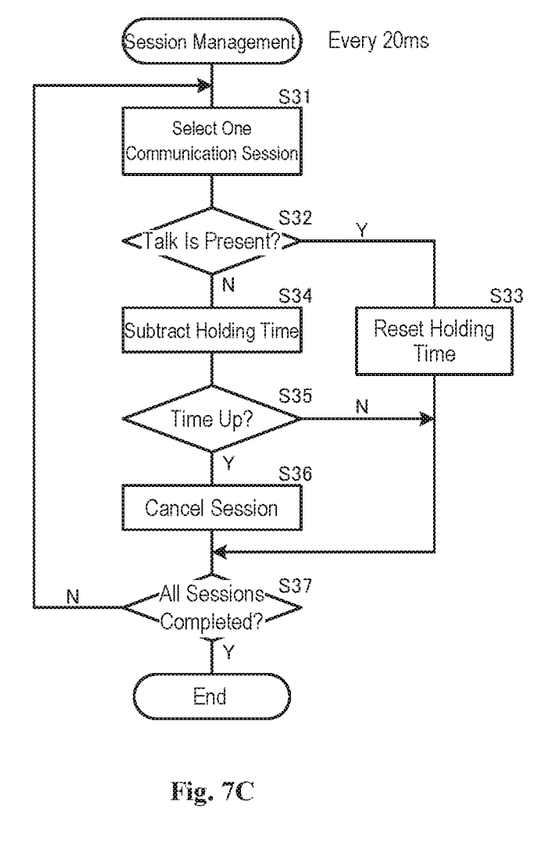
FIG. 7C is a flow chart illustrating session management processing of the server.

FIG. 7C is a flow chart illustrating a session management operation of the server 11, that is, a management operation of the mixing table 303. This processing is executed for every frame. First, the control unit 30 selects one communication session registered in the mixing table 303 (S31). The control unit 30 determines whether there has been a voice signal (voice packet) received in the frame this time in this communication session or not (S32). If there is a received voice signal (YES at S32), the control unit 30 determines that the conversation is continuing and resets the holding time (S33) and proceeds to S37. The holding time is reset to 15 seconds, for example.

If no voice signal has been received in the frame this time (NO at S32), the control unit 30 determines that the conversation is interrupted and subtracts the holding time by one frame (S34). If the holding time is timed up by means of this subtraction (Yes at S35), the control unit 30 determines that the conversation has been finished and cancels this communication session (S36). If there is the terminal device 14 belonging also to another communication session in the terminal devices 14 having participated in the cancelled communication session, the control unit 30 causes this terminal device 14 to participate in the communication session to which it belongs (S36). After that, the control unit 30 proceeds the processing to S37. If it is determined at S35 that the holding time has not been timed up (No at S35), too, the processing is proceeded to S37. The control unit 30 repeatedly executes the aforementioned processing for all the communication sessions (S37) and finishes the processing.

The priority of each of the communication forms is not limited to those illustrated in the aforementioned embodiment. If a plurality of the communication sessions in the same communication form is formed, those formed later may be given priority.

In this embodiment, the terminal device 14 communicates with the server 11 through the wireless LAN 16. On the other hand, the present invention can be applied even to the terminal device 14 communicating with the server 11 only over the wired network 15. The communication form is not limited to the full-duplex mode. It may be a half-duplex mode.

In this embodiment, the example in which the present invention is applied to a group (communication session) formed temporarily by a calling voice packet is illustrated. On the other hand, the present invention can be also applied to communication of a plurality of groups formed permanently or fixedly.

REFERENCE NUMERALS

11 Server (Relaying device)
12 Management device
13 Wireless access point
14 Terminal device
20 Control unit (for terminal device)
30 Control unit (for server)
32 Network communication unit
220 PTT (push-to-talk) switch
301 Terminal table
302 Group table
303 Mixing table

What is claimed is:

1. A relaying device comprising:
a network communication unit connected to a communication network and communicating with a plurality of terminal devices over the communication network; and
a control unit controlling voice communication between the plurality of terminal devices by transferring a voice signal received from one of the plurality of terminal devices via the network communication unit to at least one of remaining one of the plurality of terminal devices of a communication partner, wherein
the control unit:
   forms a plurality of communication sessions to which the plurality of terminal devices belong;
   includes a table in which a participating terminal, which is a terminal device that belongs to and participates in a communication session, and a non-participating terminal, which is a terminal device that belongs to but does not participate in a communication session, are registered for each of the plurality of communication sessions;
   registering, in the table, a terminal device belonging to one communication session as a participating terminal for the one communication session;
   registering, in the table, a terminal device belonging to two or more communication sessions as a participating terminal for one of the two or more communication sessions and as a non-participating terminal for a reminder of the two or more communication sessions; and
   when the voice signal is received from a transmitting terminal device in a first communication session, transfers the received voice signal to another participating terminal device participating in the first communication session and transfers simultaneously to a predetermined one of the non-participating terminal devices belonging to the first communication session by mixing the received voice signal with a voice signal of a second communication session to which the predetermined one of the non-participating terminal devices also belong as a participating terminal.

2. The relaying device according to claim 1, wherein
the relaying device further comprises a storage unit for storing, for each of the non-participating terminal devices, whether the voice signal of the communication session to which the non-participating terminal device belongs but in which the non-participating terminal device does not participate is to be transferred or not, and
the control unit determines to which the non-participating terminal device the voice signal of the communication session is to be transferred on the basis of a storage content of the storage unit.

3. The relaying device according to claim 1, wherein
the control unit:
forms the communication session in response to a call from the terminal device; and
cancels the communication session if a state in which the voice signal is not received from the terminal device participating in the communication session continues for a certain period of time.

4. The relaying device according to claim 3, wherein
the call from the terminal device includes information specifying the communication partner; and the control unit selects the terminal device allowed to belong to the communication session to be formed on the basis of the information specifying the communication partner.

5. The relaying device according to claim 1, wherein the control unit determines in which communication session the terminal device belonging to two or more communication sessions is allowed to participate on the basis of a priority order of the two or more communication sessions.

6. The relaying device according to claim 1, wherein the control unit transfers the voice signal to the terminal device for each given short time section, and
when the control unit transfers the voice signals received from the plurality of terminal devices in the time section to another terminal device, the control unit may mix the plurality of voice signals and transmit the voice signals as a single voice signal.

7. The relaying device according to claim 1, wherein the communication with the terminal device is performed in the full-duplex mode.

8. A communication relaying method executed by a relaying device comprising: a network communication unit connected to a communication network and communicating with a plurality of terminal devices over the communication network; a control unit controlling voice communications between the plurality of terminal devices by transferring a voice signal received from one of the plurality of terminal devices via the network communication unit to at least one of remaining one of the plurality of terminal devices of a communication partner, and a storage unit storing information of the terminal devices, the method comprising:
forming a plurality of communication sessions to which a plurality of the terminal devices belong;
providing in a storage unit a table in which a participating terminal, which is a terminal device that belongs to and participates in a communication session, and a non-participating terminal, which is a terminal device that belongs to but does not participate in a communication session, are registered for each of the plurality of communication sessions;
registering, in the table, a terminal device belonging to one communication session as a participating terminal for the one communication session;
registering, in the table, a terminal device belonging to two or more communication sessions as a participating terminal for one of the two or more communication sessions and as a non-participating terminal for a reminder of the two or more communication sessions; and
when the voice signal is received from a transmitting terminal device in a first communication session, transferring the received voice signal to another participating terminal device participating in the first communication session and transferring simultaneously to a predetermined one of the non-participating terminal devices belonging to the first communication session by mixing the received voice signal with a voice signal of a second communication session to which the predetermined one of the non-participating terminal devices also belong as a participating terminal.

9. A voice communication system having a relaying device and a plurality of terminal devices connected to each other over a communication network, wherein
the terminal device transmits a voice signal including information specifying a communication partner to the relaying device;
the relaying device:
forms a plurality of communication sessions to which the terminal devices belong including the terminal device having transmitted the voice signal and the terminal device of the communication partner of the terminal device;
includes a table in which a participating terminal, which is a terminal device that belongs to and participates in a communication session, and a non-participating terminal, which is a terminal device that belongs to but does not participate in a communication session, are registered for each of the plurality of communication sessions,
when there is the terminal device belonging to two or more communication sessions, registers the terminal device as a participating terminal device for one of the two or more communication sessions and as a non-participating terminal for a remainder of the two or more communication sessions;
transfers the voice signal received from a participating terminal device belonging to a first communication session to another participating terminal device and simultaneously to a non-participating terminal device belonging to the first communication session by mixing the received voice signal with a voice signal of a second communication session to which the non-participating terminal device also belongs as a participating terminal; and
the terminal device receives the voice signal from the relaying device and outputs the voice signal as a sound.

* * * * *